Figure 1:
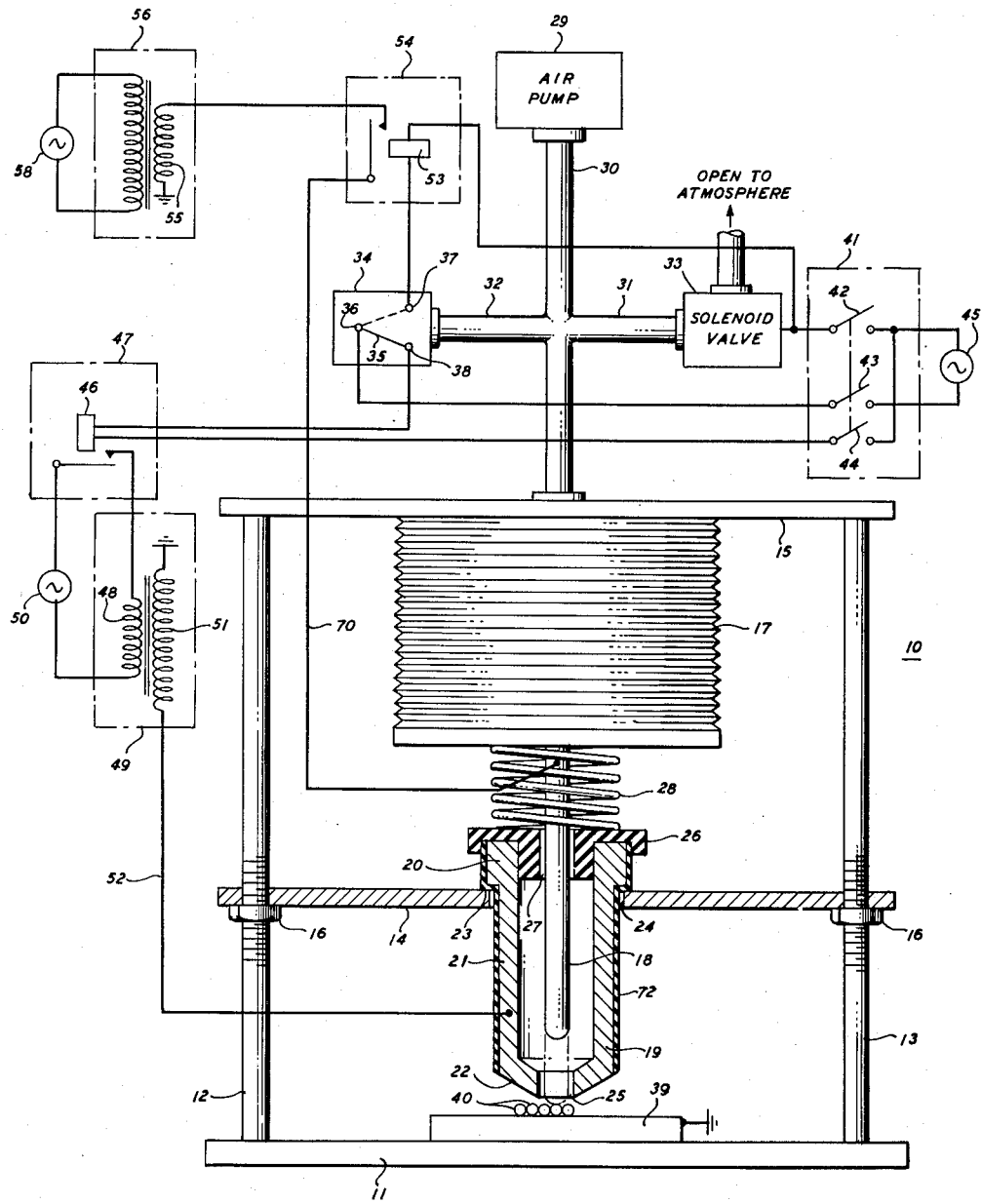

April 3, 1962  S. S. CHARSCHAN  3,028,480
DEVICE FOR TERMINATING INSULATED CONDUCTORS
Filed Aug. 25, 1960  2 Sheets-Sheet 1

INVENTOR
S. S. CHARSCHAN
BY
Albert R. Hodges
ATTORNEY

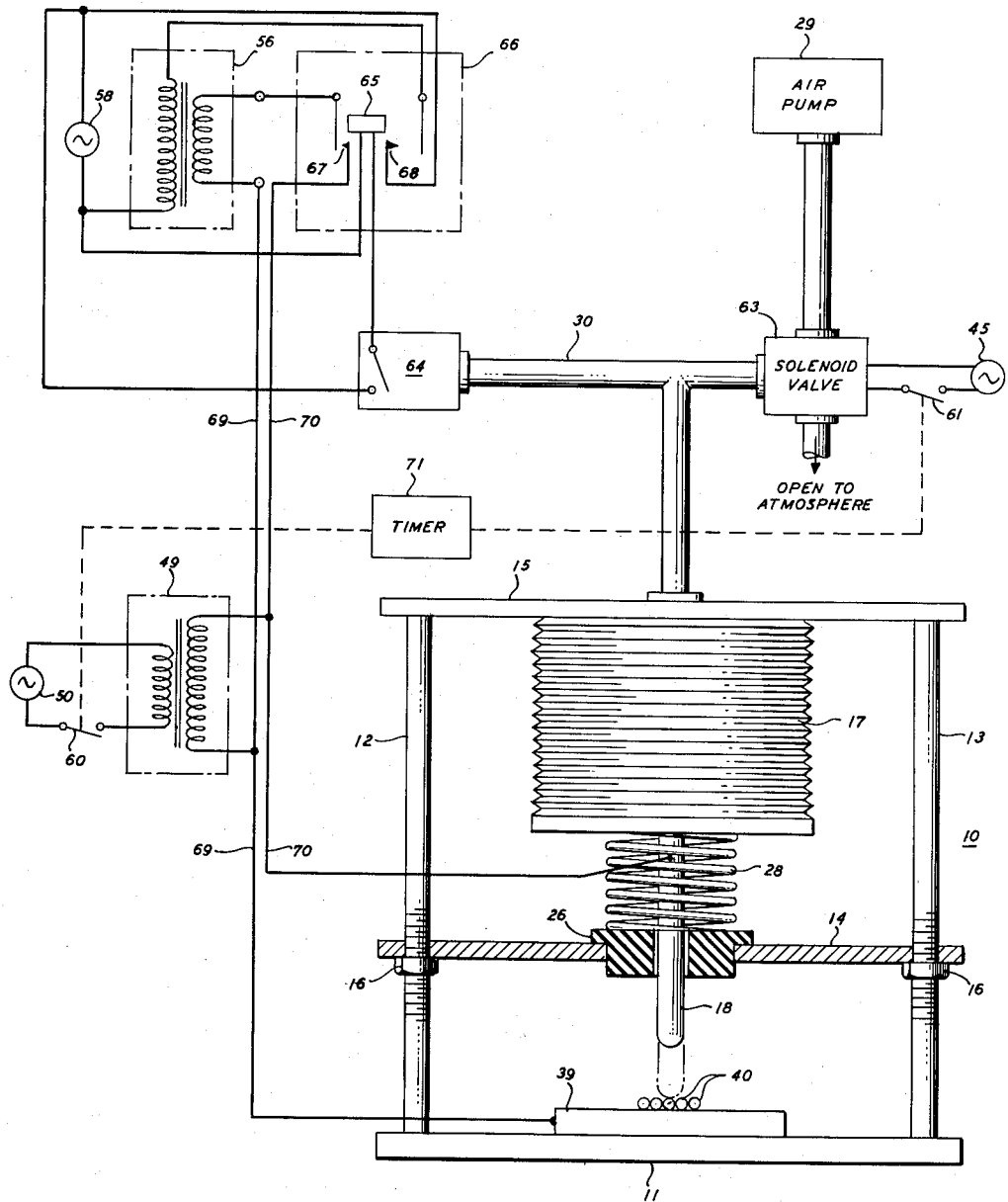

United States Patent Office 3,028,480
Patented Apr. 3, 1962

3,028,480
DEVICE FOR TERMINATING INSULATED CONDUCTORS
Sidney S. Charschan, Levittown, Pa., assignor to Western Electric Company, Incorporated, New York, N.Y., a corporation of New York
Filed Aug. 25, 1960, Ser. No. 51,863
8 Claims. (Cl. 219—78)

This invention relates to apparatus that expeditiously removes insulating material from electrical conductors and rapidly connects these conductors to a conductive element. More particularly, the invention relates to apparatus that successively removes insulation from conductors by burning holes in their insulation covers by means of a high-voltage spark, or by carbonizing the insulation covers thereby to degrade its insulating properties, and then passes a high current between the conductors and a terminal to which they are to be connected so as to weld them together.

In the manufacture of electrical equipment it is usually necessary to manually strip insulating materials from electrical conductors before they are connected to electrical terminals. Such manual removal of insulating material from a large number of conductors requires considerable time and is very tedious work. Further, after such manual removal there is the additional time-consuming step of positioning the conductors in intimate contact with the electrical terminal to which they are to be connected. The present invention eliminates the requirement for such laborious manual insulation stripping and conductor positioning by providing an apparatus which rapidly removes insulation from conductors and automatically terminates them without requiring the assistance of an operator.

As its principal object, this invention provides an apparatus capable of rapidly and efficiently removing insulation from conductors and then welding the conductors to a terminal.

Another object of this invention is to provide apparatus which is capable of operating rapidly and substantially continuously on groups of conductors and electrical terminals to which they are to be connected, it being required only that the operator successively insert each of the electrical terminals and its associated group of insulated conductors into the apparatus.

In accordance with the instant invention, these objects are accomplished by providing apparatus comprising a low-current, high-voltage circuit for producing a high-voltage spark that removes insulation from the conductors at a desired point, and a high-current, low-voltage circuit which is rapidly activated after such insulation removal in order to pass a high current between the conductors and the terminal so as to weld them together.

A preferred embodiment of the invention comprises a hollow electrode which is positioned in close proximity to one or more conductors placed upon an electrical terminal to which the conductors are to be welded, and a rod electrode which may be moved automatically through the hollow electrode so as to engage the conductors. The hollow electrode is connectable to a high-voltage, low-current circuit that provides a high-voltage spark for removing the insulation from the conductors. Associated with the rod electrode is a pneumatic system that moves the rod electrode into engagement with the conductors from which insulation has been removed, deactivates the high-voltage, low-current circuit and activates a low-voltage, high-current circuit that causes a high welding current to pass between the conductors and the electrical terminal.

A second preferred embodiment differs principally from the first in that a rod electrode is first electrically connected to a high-voltage, low-current circuit to provide the desired high-voltage spark and is then electrically connected to a low-voltage, high-current circuit to provide the welding current.

A complete understanding of the invention may be obtained from the following detailed description of the apparatus forming specific embodiments thereof when read in conjunction with the appended drawings, in which:

FIG. 1 illustrates a first embodiment of the instant invention which comprises a first electrode that provides a high-voltage spark and a second electrode that provides a high welding current; and FIG. 2 illustrates a second embodiment of the invention which comprises a single electrode that successively provides a high-voltage spark and a high welding current.

Referring to the drawings, FIG. 1 illustrates an arrangement which comprises a frame 10 having a base plate 11, vertical support rods 12 and 13 connected to plate 11, and cross support members 14 and 15 which are supported by rods 12 and 13 and lie in planes parallel to plate 11. The relative position of support member 14 with respect to base plate 11 may be varied by moving the former along the rods 12 and 13 by rotating nuts 16.

Fixedly connected to support member 15 is the top end of an air bellows 17. Attached to the bottom of bellows 17 so as to be movable therewith is a rod electrode 18. Encompassing a portion of and in axial alignment with rod electrode 18 is a hollow electrode 19. Hollow electrode 19 preferably comprises two cylindrical sections 20 and 21 and a funnel section 22. Section 20 has a greater outer diameter than that of section 21 and thus defines a shoulder 23. The diameter of an aperture 24 in support member 14 is made less than that of the outer diameter of section 20 so as to prevent hollow electrode 19 from passing completely through member 14. To insulate electrode 19 from support member 14, the outer surfaces of sections 20 and 21 are covered by an insulating material 72. The interior of hollow electrode 19 comprises a longitudinal aperture whose diameter is much larger than that of rod electrode 18, except in the vicinity of funnel section 22. Section 22 is provided with an aperture 25 which is slightly larger in diameter than rod electrode 18. Accordingly, rod electrode 18 may be moved along the longitudinal axis of hollow electrode 19 without engaging any part of hollow electrode 19.

To confine the movement of rod electrode 18 along the longitudinal axis of hollow electrode 19 so as to prevent the former from engaging the latter, a cap bushing 26 is positioned partly within the aperture of hollow electrode 19. Since cap bushing 26 has a cylindrical aperture 27 whose diameter is only slightly larger than that of rod electrode 18, it permits rod electrode 18 to move only along the longitudinal axis of hollow electrode 19. Further, bushing 26 is comprised of an insulating material so as to insulate electrodes 18 and 19 from each other.

Positioned between the bottom of air bellows 17 and cap bushing 26 is a coil spring 28, the longitudinal axis of which is also coincident with that of rod electrode 18. Spring 28 resists the downward movement of the bottom end of bellows 17 and rod electrode 18 which is attached thereto. Only when the air pressure in bellows 17 is increased sufficiently to expand the bellows and compress spring 28 will the bottom of bellows 17 and electrode 18 be moved downward.

Bellows 17 is connected to an air pump 29 by means of a tube member 30. Member 30 comprises tap connections 31 and 32 which are connected, respectively, to a solenoid valve 33 whose normal condition is "open to atmosphere" and to a pressure-controlled switch 34. Pressure-controlled switch 34 comprises a pivot arm 35 one end of which is permanently connected to a terminal 36, while the other end engages either a terminal 37 when the air pressure in tap connection 32 reaches a predetermined level or a terminal 38 when the air pressure in tap connection 32 has not reached the predetermined level.

A clear understanding of the manner in which the electrical circuitry of this embodiment cooperates with the aforementioned structural elements is best acquired from the following explanation of its operation:

First, an electrical terminal 39 and insulated conductors 40 are positioned on base plate 11 under electrodes 18 and 19. The elevation of electrode 19 is adjusted by rotating nuts 16 so as to be approximately one-sixteenth of an inch from conductors 40.

A normally open, ganged foot-pedal switch 41, which comprises single-pole, single-throw switches 42, 43 and 44, is closed so as to connect a potential source 45, which may be a standard 110-volt, 60-cycle outlet, across solenoid valve 33. The application of potential to solenoid valve 33 causes it to assume its closed condition, thus eliminating air leakage from member 30. Accordingly, as air is pumped into and partially through member 30 to bellows 17, the pressure in these elements increases. To compensate for such increase in air pressure, bellows 17 expands as limited by spring 28. Such limited expansion causes a delayed downward motion of rod electrode 18.

Prior to the closure of switch 41, the air pressure in member 30 and bellows 17 is relatively low since solenoid valve 33 is in its normal "open to atmosphere" condition. Consequently, pressure-controlled switch 34 is in its low-pressure condition, i.e., pivot arm 35 connects terminals 36 and 38. Switch 34 retains this condition until the air pressure in member 30 and bellows 17 is raised to a predetermined high level.

Further, at the instant switch 41 is closed, the magnetic coil 46 of a normally open relay 47 is connected to potential source 45 since pivot arm 35 connects terminal 36 to terminal 38 at this time. Energized coil 46 compels relay 47 to assume its closed condition so as to connect the low-voltage primary winding 48 of a high-voltage transformer 49 across a potential source 50, which also may be a standard 110-volt, 60 cycle outlet. One end of the high-voltage secondary winding 51 of transformer 49 is electrically connected by a lead 52 to hollow electrode 19, while its other end is grounded.

The connection of transformer 49 to potential source 50 by relay 47 provides a potential difference of such magnitude between hollow electrode 19 and grounded electrical terminal 39 that a high-voltage spark jumps the gap therebetween. This spark removes the insulation from electrical conductors 40 and so prepares them for subsequent welding. Further, this potential differential ionizes the atmosphere directly in and below aperture 25 of funnel section 22 of electrode 19.

As previously mentioned, upon the closure of foot-pedal switch 41, solenoid valve 33 assumes its closed condition and the bottom of bellows 17 and rod electrode 18 move slowly downward as the air pressure in member 30 and bellows 17 increases. Bellows 17 and spring 28, the latter restricting the expansion of the former, are so designed that the bottom end of rod electrode 18 is not in the immediate vicinity of aperture 25 of funnel section 22 prior to the ionization of the atmosphere in and directly below aperture 25. Since the longitudinal aperture of hollow electrode 19 has a diameter much larger than that of rod electrode 18, the shortest distance between electrodes 18 and 19 prior to the time rod electrode 18 comes within the immediate vicinity of aperture 25 is of such magnitude that there is no sparking between these electrodes. Once the atmosphere within and directly below aperture 25 has been ionized, the entry of the lower end of rod electrode 18 into aperture 25 does not cause sparking between the electrodes since such ionization of the atmosphere provides a low-resistance path between hollow electrode 19 and electrical terminal 39.

After rod electrode 18 has passed down through aperture 25, its engagement with conductors 40 prevents further downward movement of itself and that of the bottom of bellows 17. Since air is pumped into member 30 and bellows 17 by pump 29 even after the downward movement of the bottom of bellows 17 ceases, the air pressure in the tubing and the bellows rapidly increases.

When the air pressure in member 30 has increased to the predetermined level, pressure-controlled switch 34 is switched to its high-pressure condition, i.e., arm 35 pivotally rotates so as to disconnect terminal 36 from terminal 38 and to connect terminal 36 to terminal 37. The disconnection of terminal 38 from terminal 36 deenergizes magnetic coil 46 of relay 47 by opening the circuit connecting potential source 45 to coil 46. Once coil 46 is deenergized, relay 47 assumes its open condition, thus disconnecting potential source 50 from low-voltage primary winding 48. Accordingly, high-voltage transformer 49 is rendered inoperative and no longer provides a high potential differential between hollow electrode 19 and terminal 39.

The connection of terminal 36 to terminal 37 of pressure-controlled switch 34 by pivot arm 35 connects potential source 45 across the magnetic coil 53 of a relay 54 so as to close its contacts. The closure of relay 54 connects one end of the low-voltage, high-current secondary winding 55 of a welder transformer 56 to rod electrode 18 through a lead 70 while the other end of secondary winding 55 is connected to ground. High-voltage, low-current primary winding 57 of welder transformer 56 is connected across a potential source 58, which may also be a standard 110-volt, 60-cycle outlet. Since rod electrode 18 engages electrical conductors 40 after the insulation has been removed therefrom by the high-voltage spark, welding transformer 56 causes a high welding current to pass through lead 70, rod electrode 18, electrical conductors 40, and terminal 39 to ground. Maintaining the normally open, foot-pedal switch 41 in its closed position for a short period of time enables this current to weld electrical conductors 40 to terminal 39. Upon allowing foot-pedal switch 41 to assume its open condition, solenoid valve 33 is disconnected from potential source 45. Such disconnection causes valve 33 to assume its "open to atmosphere" condition, thus providing an air leakage path in member 30. The resulting air leakage reduces the air pressure in air bellows 17 which permits spring 28 to move the bottom of bellows 17 and electrode 18 to their initial elevated positions, thus permitting the removal of the welded elements from the apparatus.

FIG. 2 illustrates a second embodiment of the invention which utilizes a high-voltage spark to remove insulation from electrical conductors and then passes a high welding current between the conductors and an electrical terminal. An important distinction between this embodiment and that previously described is that this second embodiment removes insulation and welds by means of a single electrode. The structural elements of this embodiment and the manner in which it operates will now be described.

First, electrical terminal 39 and electrical conductors 40 are positioned on face plate 11 under rod electrode 18. The elevation of electrode 18 is adjusted by turning nuts 16 so that its distance from conductors 40 is approximately one-sixteenth of an inch.

Next, a timer 71 for sequential operation of microswitches 60 and 61, is activated. Preferably, timer 71 has an on-off cycle of 5 seconds. Microswitch 60 is closed at the instant the timer is activated and connects potential source 50 to high-voltage transformer 49. Upon such application of potential, transformer 49 provides a high potential differential between electrode 18 and electrical terminal 39. This potential differential causes a high-voltage spark to jump the gap between electrode 18 and terminal 39, the spark removing the insulation from electrical conductors 40. Two and one-half seconds later, timer 71 closes microswitch 61 so as to connect potential source 45 to solenoid valve 63. Potential source 45 compels valve 63 to switch from its "open to atmosphere" condition to its "open" condition, thus permitting air to flow from air pump 29 into member 30 and bellows 17. Three seconds after timer 71 is activated, microswitch 60 is opened so as to deactivate transformer 49. Bellows 17 expands as the air pressure therein increases and electrode 18 is moved downward. As soon as electrode 18 engages conductors 40, the bottom of bellows 17 is prevented from moving further downward by electrode 18, thus preventing further expansion of the bellows. Since bellows 17 cannot further expand, the air pressure therein increases rapidly as air is pumped thereinto. When this air pressure reaches the switching level of a normally open, pressure-controlled switch 64, switch 64 closes, connecting potential source 58 across the magnetic coil 65 of a multiple contact relay circuit 66.

Magnetically controlled switches 67 and 68 of relay circuit 66 are so positioned with reference to magnetic coil 65 that switch 67 closes before switch 68 upon the energization of coil 65. Accordingly, when the air pressure in member 30 causes pressure switch 64 to connect potential source 58 across coil 65, switch 67 assumes its closed condition and connects, by way of leads 69 and 70, the output terminals of welder transformer 56 across electrode 18 and electrical terminal 39. Since switch 68 remains open a short interval of time after switch 67 has been closed, welder circuit 56 is not immediately activated. After this short interval of time has passed, switch 68 assumes its closed condition and connects potential source 58 to the input terminals of welder transformer 56. Closure of switch 67 prior to the activation of welder transformer 56 prevents sparking at switch 67. Upon the activation of welder transformer 56, a high welding current passes between electrical conductors 40 and electrical terminal 39.

Four and one-half seconds after timer 71 is activated, it opens microswitch 61 so as to disconnect potential source 45 from solenoid valve 63. This disconnection causes solenoid valve 63 to assume its "open to atmosphere" condition, thus providing an air leakage path in member 30. The resulting decrease in air pressure in bellows 17 permits coil spring 28 to move the bottom of bellows 17 and electrode 18 up and away from the welded elements. The decrease in air pressure also causes normally open, pressure-controlled switch 64 to assume its open condition, thus disconnecting potential source 58 from magnetic coil 65. Once coil 65 is disconnected, switches 67 and 68 assume their "open" condition in reverse sequence, i.e., switch 68 opens before switch 67 opens, thus preventing sparking upon the disconnection and deactivation of welder transformer 56. Five seconds after the activation of timer 71, electrode 18 is in its initial elevated position and the welded elements may be removed from base plate 11.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for sequentially removing insulation from an electrical conductor and welding same to a conductive element, which comprises support means, electrode means mounted on said support for movement relative to an insulated electrical conductor interposed between the electrode means and an electrically conductive element to which the conductor is to be welded, drive means coupled to said electrode means for moving said electrode means toward the insulated electrical conductor, high-voltage circuit means and high-current circuit means each connected across said electrode means and said conductive element, and switching means responsive to said drive means for activating said high-voltage circuit means and said high-current circuit means in a predetermined sequence to activate the high-voltage circuit means as the electrode means is moved into close proximity with said electrical conductor to cause high-voltage sparking sufficient to remove portions of the conductor insulation, and then upon further movement of the electrode means toward said conductor to activate the high-current circuit means to pass a current between the portion of the conductor from which the insulation has been removed and said conductive element to weld the conductor to the conductive element.

2. Apparatus for removing insulation from conductors and welding same to a conductive element, said apparatus comprising an electrode means whose relative position in regard to conductors placed with a conductive element into said apparatus is controlled by a pneumatic system, said conductors and said conductive element being adjacently disposed, a high-voltage circuit connected to said electrode means for providing high-voltage sparking between said electrode means and said conductive element, pumping means for increasing the pressure in said pneumatic system so as to move said electrode means into engagement with said conductors, and a high-current circuit connected to said electrode means for passing a welding current through said conductors and said conductive element.

3. Apparatus for removing insulation from conductors and welding same to an electrical terminal, said apparatus comprising an electrode means movable by a pneumatic system into engagement with conductors placed upon a terminal positioned within a frame structure of said apparatus, said system having a solenoid valve that controls the pressure therein, an expandable bellows one end of which is supported by said frame structure and the other end of which is attached to said electrode means, and a pressure-controlled switch within said system that assumes either a low or a high-pressure condition in response to the air pressure within said system, said apparatus further comprising a high-voltage circuit connected to said electrode means and energized when said controlled switch is in its low-pressure condition to provide high-voltage sparking between said electrode means and said terminal, pumping means for increasing the pressure in said system so as to expand said bellows and to move said electrode means into engagement with said conductors, and a high-current circuit connected to said electrode means and energized when said controlled switch is in its high-pressure condition so as to provide a high welding current between said conductors and said electrical terminal.

4. Apparatus in accordance with claim 3, in which said electrode means comprises a hollow electrode one end of which defines a funnel section, an apertured bushing of insulating material positioned at least partly within said hollow electrode remote from said funnel section, and a rod electrode positioned at least partly within said bushing and said hollow electrode, the diameter of said rod being slightly smaller than the diameter of the aperture of said bushing and the inner diameter of said hollow electrode in the vicinity of said funnel section, and much smaller than that of the inner diameter of said hollow electrode remote from said funnel section.

5. Apparatus in accordance with claim 4, wherein said rod electrode is fixedly attached to one end of said expandable bellows, and a spring member is positioned between said one end of said bellows and said bushing to resist expansion of the bellows when the pressure therein is increased.

6. Apparatus for removing insulation from conductors and welding same to an electrical terminal, said apparatus comprising a frame structure having a base plate upon which conductors and an electrical terminal are positioned, said conductors and said terminal being adjacently disposed, a hollow electrode fixedly positioned by said frame structure in close proximity to said conductors, a pneumatic system having an expandable bellows one end of which is supported by said frame structure and the other end of which is attached to a rod electrode positioned within said hollow electrode, a spring member positioned between said other end of said bellows and said hollow electrode to resist the expansion of said bellows, and pumping means for increasing the pressure in said system so as to expand said bellows and move said rod electrode slowly toward and into engagement with said conductors, a high-voltage circuit one end of which is connected to said hollow electrode, a pressure-controlled switch that connects the other end of said high-voltage circuit to a potential source when the pressure in said system is below a predetermined level, and a high-current circuit one end of which is connected to said rod electrode and the other end of which is connected by said pressure-controlled switch to a second potential source when the rod electrode engages said conductors and the pressure in said system reaches said predetermined level, whereby the hollow electrode provides high-voltage sparking to remove the insulation from said conductors and the rod electrode causes a high welding current to pass through said conductors and said terminal.

7. Apparatus for removing insulation from conductors and welding same to a conductive element, said apparatus comprising an electrode whose relative position in regard to conductors and a conductive element placed in a frame structure of said apparatus is controlled by a pneumatic means, said conductors and said conductive element being adjacently disposed, the pneumatic means moving the electrode toward and into engagement with said conductors as the pressure therein increases, a high-voltage circuit connected to said electrode, a first potential source connectable to said high-voltage circuit by an automatic switching means, said pneumatic means comprising an air pressure valve controlled by said automatic switching means and a pressure-controlled switching means, a multiple contact relay circuit connected to said pressure-controlled switching means and energized thereby when the pressure in said system reaches a predetermined value, a high-current circuit having output and input terminals, said output terminals being connected across said electrode and said conductive element and said input terminals being connected across a second potential source in sequential order upon the energization of said relay circuit, whereby said high-voltage circuit provides high-voltage sparking that removes the conductor insulation, the pneumatic system moves said electrode into engagement with said conductors, and said high-current circuit causes a welding current to pass between said conductors and said conductive element after said insulation has been removed.

8. Apparatus in accordance with claim 7, in which a first switching means connects the input of said high-voltage circuit to said first potential source, a second switching means connects a third potential source to said air pressure valve, and said automatic switching means comprises a timer means that sequentially operates said first and second switching means.

References Cited in the file of this patent
UNITED STATES PATENTS

| | | |
|---|---|---|
| 1,189,584 | Kicklighter | July 4, 1916 |
| 2,021,173 | Clark | Nov. 19, 1935 |
| 2,101,156 | Payne | Dec. 7, 1937 |
| 2,298,937 | Green | Oct. 13, 1942 |
| 2,807,705 | Arrain | Sept. 24, 1957 |
| 2,903,555 | Porterfield | Sept. 8, 1959 |